(12) United States Patent
Sano et al.

(10) Patent No.: US 8,368,282 B2
(45) Date of Patent: Feb. 5, 2013

(54) DISK DRIVE DEVICE ROTATIONALLY DRIVING RECORDING DISK

(75) Inventors: Minoru Sano, Shizuoka (JP); Tetsuo Kitamura, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 432 days.

(21) Appl. No.: 12/691,709

(22) Filed: Jan. 21, 2010

(65) Prior Publication Data
US 2010/0238591 A1   Sep. 23, 2010

(30) Foreign Application Priority Data

Mar. 19, 2009 (JP) .................................. 2009-068737

(51) Int. Cl.
*H02K 21/04* (2006.01)
(52) U.S. Cl. .............. 310/263; 310/156.66; 310/156.71; 310/156.73; 310/181
(58) Field of Classification Search ............. 310/156.32, 310/156.43, 156.44, 156.45, 156.46, 158, 310/210, 49.06, 49.19, 49.21, 49.22; 417/353; 360/99.08, 224
See application file for complete search history.

(56) References Cited

U.S. PATENT DOCUMENTS

| 4,280,072 | A | * | 7/1981 | Gotou et al. ................. 310/67 R |
| 4,812,692 | A | * | 3/1989 | Arita ...................... 310/216.097 |
| 5,804,904 | A | * | 9/1998 | Park et al. .............. 310/216.074 |
| 6,384,503 | B1 | * | 5/2002 | Iwaki et al. ............... 310/156.47 |
| 7,034,424 | B2 | * | 4/2006 | Kometani et al. ........ 310/156.47 |
| 7,514,831 | B2 | * | 4/2009 | Tamaoka ........................ 310/90 |
| 2007/0007841 | A1 | * | 1/2007 | Tamaoka ................. 310/156.45 |

FOREIGN PATENT DOCUMENTS

| JP | 05-191937 | 7/1993 |
| JP | 2000-312448 | 11/2000 |
| JP | 2001-016806 | 1/2001 |
| JP | 2002-281702 | 9/2002 |
| JP | 2007-189830 | 7/2007 |

OTHER PUBLICATIONS

JPO Office Action, Apr. 11, 2012, 3 pages.

* cited by examiner

*Primary Examiner* — Quyen Leung
*Assistant Examiner* — Naishadh Desai
(74) *Attorney, Agent, or Firm* — Fulwider Patton LLP (57) ABSTRACT

A disk drive device includes: a hub on which a recording disk is to be mounted; a base configured to rotatably support the hub via a bearing; a core that is fixed to the base and includes a circular portion and S salient poles (where S is a natural number greater than or equal to 3) extending from the circular portion in the diameter direction; a three-phase coil that is formed by being wound around each of the S salient poles; and a magnet that is fixed to the hub and faces the S salient poles in the diameter direction, and that is provided with P driving magnetic poles in the circumferential direction (where P is a natural number greater than or equal to 2). In the disk drive device, the fundamental frequency component of the cogging torque based on the LCM (Least Common Multiple) of S and P (where S is the number of the salient poles of the core and P is the number of the driving magnetic poles of the magnet), is smaller than the second frequency component of the cogging torque, the frequency of which is twice the fundamental frequency.

17 Claims, 11 Drawing Sheets

DISK DRIVE DEVICE ROTATIONALLY DRIVING RECORDING DISK

CROSS-REFERENCE TO RELATED APPLICATION

This application is based upon and claims the benefit of priority from the prior Japanese Patent Application No. 2009-068737, filed on Mar. 19, 2009, the entire content of which is incorporated herein by reference.

BACKGROUND OF THE INVENTION

1. Field of the Invention

The present invention relates to a disk drive device that drives a recording disk.

2. Description of the Related Art

Recently, disk drive devices such as HDDs have been drastically improved in their performance by being provided with a fluid dynamic bearing. With this improvement, the disk drive devices have been required to be operable at a higher speed. For example, the rotational speed of a disk drive device that magnetically records data has been conventionally 3600/min; however, the speed has been increased to 5400/min and is further being increased to 7200/min.

Herein, the torque ripple and the cogging torque generated by a drive unit that rotationally drives a recording disk may cause the vibration of the disk drive device. For example, Japanese Patent Application Publication No. 2000-312448 discloses an electric motor in which the occurrence of the cogging phenomenon is suppressed.

The torque ripple and the cogging torque include many harmonic components, which are generally increased in proportion to the increased rotational speed. As the harmonic components in the torque ripple and the cogging torque are increased, the vibration of the recording disk is increased.

Large vibration of the recording disk disturbs the tracing of the recording tracks by the magnetic head, causing a failure in reading/writing data, that is, deteriorating the so-called error rate. Accordingly, the rotational speed of the recording disk cannot be increased, and thereby the disk drive device is hampered in being operable at a higher speed.

SUMMARY OF THE INVENTION

The present invention has been made in view of these situations, and a purpose of the invention is to provide a disk drive device in which the vibration of the recording disk can be suppressed by reducing a particular component of torque ripple or cogging torque in the disk drive device.

In order to solve the aforementioned problem, the disk drive device according to an embodiment of the present invention comprises: a hub on which a recording disk is to be mounted; a base configured to rotatably support the hub via a bearing; a core that is fixed to the base and includes a circular portion and S salient poles (where S is a natural number greater than or equal to 3) extending from the circular portion in the diameter direction; a three-phase coil that is formed by being wound around the S salient poles; and a magnet that is fixed to the hub and faces the S salient poles in the diameter direction, and that is provided with P driving magnetic poles in the circumferential direction (where P is a natural number greater than or equal to 2). In this disk drive device, the fundamental frequency component of the cogging torque based on the LCM (Least Common Multiple) of S and P (where S is the number of the salient poles of the core, and P is the number of the driving magnetic poles of the magnet) is smaller than the second frequency component thereof, the frequency of which is twice the fundamental frequency.

According to the embodiment, the fundamental frequency component of cogging torque, the major component of cogging torque, can be smaller than the second frequency component thereof, thereby allowing for the vibration due to the cogging torque to be suppressed.

Another embodiment of the present invention also relates to a disk drive device. The disk drive device comprises: a hub on which a recording disk is to be mounted; a base configured to rotatably support the hub via a bearing; a core that is fixed to the base and includes a circular portion and S salient poles (where S is a natural number greater than or equal to 3) extending from the circular portion in the diameter direction; a three-phase coil formed by each of the S salient poles being wound; and a magnet that is fixed to the hub and faces the S salient poles in the diameter direction, and that is provided with P driving magnetic poles in the circumferential direction (where P is a natural number greater than or equal to 2). The peak-to-peak value of the fundamental frequency component of the cogging torque based on the LCM of S and P (where S is the number of the salient poles of the core and P is the number of the driving magnetic poles of the magnet), is less than or equal to 0.2 (mN·m).

According to the embodiment, the peak-to-peak value of cogging torque can be less than or equal to 0.2 (mN·m), allowing for the vibration due to the cogging torque to be suppressed.

Yet another embodiment of the present invention also relates to a disk drive device. The disk drive device comprises: a hub on which a recording disk is to be mounted; a base configured to rotatably support the hub via a bearing; a core that is fixed to the base and includes a circular portion and S salient poles (where S is a natural number greater than or equal to 3) extending from the circular portion in the diameter direction; a three-phase coil that is formed by being wound around the S salient poles; and a magnet that is fixed to the hub and faces the S salient poles in the diameter direction, and that is provided with P driving magnetic poles in the circumferential direction (where P is a natural number greater than or equal to 2). The coefficient of variation in the amplitude of the back electromotive force generated when the coil is rotated, is less than or equal to 2 percent during one rotation of the coil. According to this embodiment, the vibration due to the torque ripple can be suppressed.

It is noted that any combination of the aforementioned components or any manifestation of the present invention exchanged between methods, devices, systems and so forth, is effective as an embodiment of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

The present invention will be described below with reference to the drawings based on the preferred embodiment and a comparative technique. The same or equivalent constituting elements and members illustrated in each drawing shall be denoted by the same reference numerals, and duplicative explanations will be omitted. Dimensions of members illustrated in each drawing are appropriately enlarged or reduced for ease of understanding. Part of the members not important for describing the comparative technique and the embodiment are omitted from each drawing.

Figure 1:
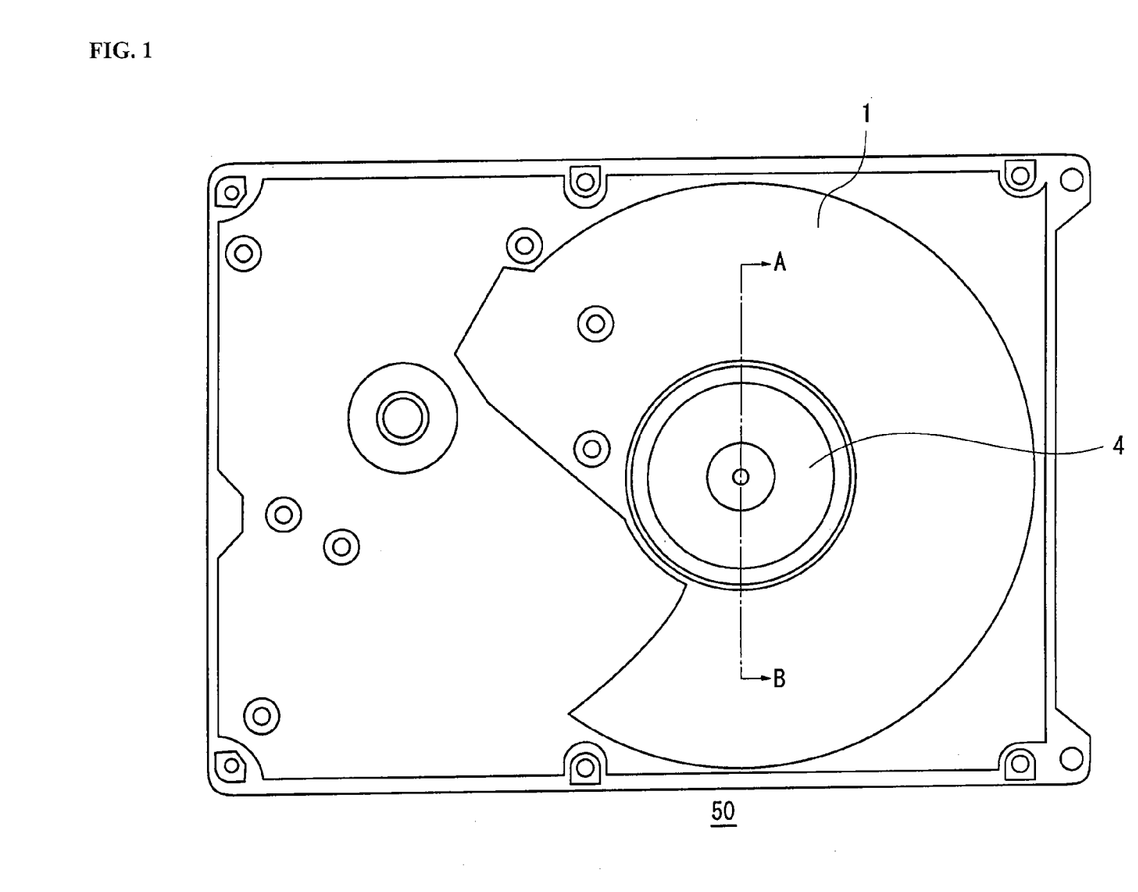
FIG. 1 is a top view of a disk drive device.
Figure 2:
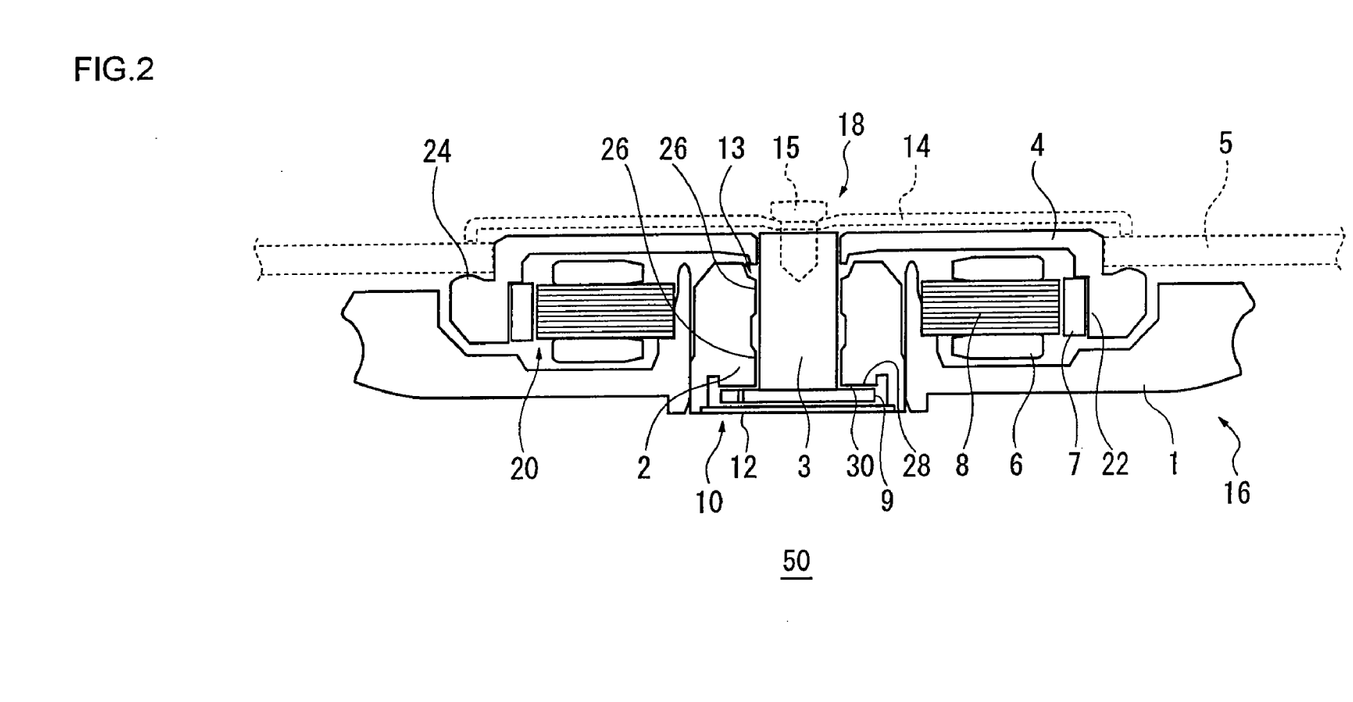
FIG. 2 is a cross-sectional view of an essential part, taken along line A-B in the disk drive device.

FIG. 1 is a top view of a disk drive device 50. FIG. 2 is a cross-sectional view of an essential part, taken along line A-B in the disk drive device 50. The disk drive device 50 comprises a fixed body portion 16 and a rotating body portion 18. The disk drive device 50 may comprise a bearing unit 10 that supports the rotating body portion 18 in a relatively rotatable manner and a drive unit 20 that rotationally drives the rotating body portion 18. The disk drive device 50 is mounted in, for example, a hard disk drive, and rotates a recording disk 5. As illustrated in FIG. 2, descriptions will be made on the premise that the side where a hub 4 is provided is the upside relative to a base 1.

The fixed body portion 16 has the base 1, a stator core 8 fixed to the base 1, a three-phase coil 6 formed by a salient pole of the stator core 8 being wound, and a sleeve 2. The base 1 rotatably supports the hub 4 via a bearing. The approximately cylindrical-shaped sleeve 2 is fixed to the approximate center portion of the base 1. One end of the sleeve 2 is adhered to a disk-shaped plate 12. That is, the lower end of the sleeve 2 is adhered to the plate 12 to be sealed by the plate 12 such that lubricant does not leak out.

The stator core 8 comprises a circular portion and twelve salient poles extending from the circular portion in the radial direction. The number of the salient poles may be S (where S is a natural number greater than or equal to 3). A magnet 7 faces the twelve salient poles in the diameter direction and is provided with eight driving magnetic poles in the circumferential direction. The number of the magnetic poles of the magnet 7 may be P (where P is a natural number greater than or equal to 2). The magnet 7 is structured so as to include a rare earth material such as, for example, Nd—Fe—B (Neodymium-Ferrum-Boron). The magnet 7 has, for example, eight driving magnetic poles along the inner circumferential direction of the inner circumferential portion of the magnet 7.

The rotating body portion 18 has the approximately cup-shaped hub 4 on which the recording disk 5 is to be mounted, a shaft 3 with one end fixed to the hub 4, a flange 9 fixed to the other end of the shaft 3, and the approximately cylindrical-shaped magnet 7 fixed to the inner cylinder portion 22 of the hub 4.

The upper end of the shaft 3 is fixed to the center hole of the hub 4, and the lower end thereof is fixed to the disk-shaped flange 9.

The hub 4 is formed into a predetermined shape, approximately cup-like shape, by machining, such as by pressing and cutting, a steel plate having a soft magnetism. An approximately doughnut-shaped clamper 14 is adhered to the hub 4 by a screw 15. The doughnut-shaped recording disk 5 is mounted on the outer tubular portion 24 of the hub 4. The clamper 14 is mounted on the recording disk 5 thus mounted in order to fix the recording disk 5. That is, the clamper 14 and the screw 15 serve as a locking means for the recording disk 5.

In the disk drive device 50, the sleeve 2 and the shaft 3, which is relatively rotatable, are arranged on the base 1, and the hub 4 rotating around the shaft 3 is installed on the base 1. Thereafter, the recording disk 5 may be mounted on the hub 4 followed by the installation of a non-illustrated magnetic head, a drive device for the magnetic head, a control circuit for both, and other necessary members.

The bearing unit 10 has a radial dynamic pressure groove 26 and a thrust dynamic pressure groove 30. The radial dynamic pressure groove 26 and the thrust dynamic pressure groove 30 serve as bearings that rotatably support the hub 4. Two herringborn-shaped radial dynamic pressure grooves 26 are formed on the inner circumferential surface of the sleeve 2 so that both are vertically spaced apart from each other. In addition, the herringborn-shaped or spiral-shaped thrust dynamic pressure grooves 30 are formed on the surface of the flange 9, facing the lower surface 28 of the sleeve 2, and on the surface thereof facing the plate 12.

A capillary seal portion 13 is provided on the upper open end side of the sleeve 2 such that the space between the inner circumferential surface of the sleeve 2 and the outer circumferential surface of the shaft 3 is formed so as to gradually extend toward the upper open end. A lubricant, such as oil, is injected into the space formed by the aforementioned radial dynamic pressure groove 26, the thrust dynamic pressure groove 30, the capillary seal portion 13, and the surface facing the capillary seal portion 13. The capillary seal portion 13 prevents the lubricant from leaking out by capillarity.

With the rotation of the shaft 3, the radial dynamic pressure groove 26 creates radial dynamic pressure in the lubricant such that the rotating body portion 18 is supported in the radial direction. Also, with the rotation of the flange 9, the thrust dynamic pressure groove 30 creates thrust dynamic pressure in the lubricant such that the rotating body portion 18 is supported in the thrust direction. Alternatively, the radial dynamic pressure groove 26 and the capillary seal portion 13 may be formed in the shaft 3 such that the inner circumferential surface of the sleeve 2 is formed into a linear shape.

The drive unit 20 has the stator core 8, the coil 6, and the magnet 7. When a three-phase current having an approximate sine wave shape is applied to the coil 6 by a predetermined drive circuit, the coil 6 creates a rotating magnetic field. A rotating drive force is generated by the interaction of the driving magnetic poles of the magnet 7 with the rotating magnetic field created by the coil 6, allowing the rotating body portion 18 to be rotated.

Herein, the driving magnetic poles of the magnet 7 are formed by using a magnetization device (not illustrated) (hereinafter, the formation of a magnetic pole in the magnet 7 by using a magnetization device is referred to as "magnetization"). The magnetization device comprises a magnetization yoke, a magnetization coil, and a magnetization power source. The magnetization yoke has eight salient poles to be magnetized in accordance with the number of magnetic poles of the magnet 7 according to the embodiment. Each of eight salient poles to be magnetized is wound with the magnetization coil. When a magnetization voltage is applied to the magnetization coil from the magnetization power source, a magnetization current flows through the magnetization coil, creating a magnetic field for magnetization in the salient pole to be magnetized. When the magnetization yoke is inserted into the magnet 7 before the magnet 7 is magnetized and then when a magnetization voltage is applied to the magnetization coil, a magnetic field for magnetization is created in the salient pole to be magnetized. The created magnetic field is transferred to the inner circumference of the magnet 7 such that the driving magnetic poles are formed in the magnet 7 in accordance with the number of the salient poles to be magnetized.

Hereinafter, the cogging torque in the disk drive device 50 will be described. The cogging torque refers to a pulsating torque that is generated when the rotating body portion 18 is rotated in a non-conducting state and that is generated by the factor of when the salient poles of the stator core 8 and the magnet 7 are magnetized. The cogging torque can be measured from, for example, the torque generated in the drive unit 20 at every position where the rotating body portion 18 is rotated in a state where a current is not applied to the coil 6. In the comparative technique to be compared with the present embodiment, in order to form strong magnetic poles in the magnet 7, a magnetization voltage that is as high as possible, for example, 1300 V, is applied to the coil such that a strong magnetic field is created, thereby forming strong magnetic poles in the magnet 7. Herein, the number of pulsations of the cogging torque per rotation of the rotating body portion 18 (hereinafter, the number of the pulsations of the cogging torque per rotation of the rotating body portion 18 is simply referred to as the "number of pulsations") is equal to the LCM of S and P (where S is the number of the salient poles of the stator core and P is the number of the magnetic poles of the magnet 7). For example, when S=12 and P=8, the LCM of S and P is 24, and, accordingly, 24 pulsations of the cogging torque are generated per rotation of the rotating body portion. The cogging torque having 24 pulsations per rotation is the major component of the cogging torque, which varies in accordance with the LCM. The pulsation that is based on the LCM is assumed to be the "fundamental frequency component" of the cogging torque. In addition, a pulsation based on a frequency that is twice the fundamental frequency is assumed to be the "second frequency component" thereof. The greater the number of pulsations, the smaller the cogging torque.

After the study on the relationship between magnetization conditions and the cogging torque, the present inventor has acquired the following knowledge. FIGS. 3A through 7B illustrate the cogging torque in the cases where the magnetization voltages for the magnet 7 are varied. FIGS. 3A, 4A, 5A, 6A, and 7A illustrate magnetic flux density waveforms on the inner circumferential surface of the magnet 7 whereas FIGS. 3B, 4B, 5B, 6B, and 7B illustrate waveforms of the cogging torque. The vertical axes of FIGS. 3A, 4A, 5A, 6A, and 7A illustrate the magnetic flux densities whereas the horizontal axes thereof illustrate the rotational angles. The vertical axes of FIGS. 3B, 4B, 5B, 6B, and 7B illustrate the torque whereas the horizontal axes thereof illustrate the rotational angles. The magnetization voltages for the magnet 7 are 1400 V, 1300 V, 1200 V, 950 V, and 800 V in the order from FIGS. 3A to 7B. The LCMs in FIGS. 3A through 7B are all 24.

Figure 3A:
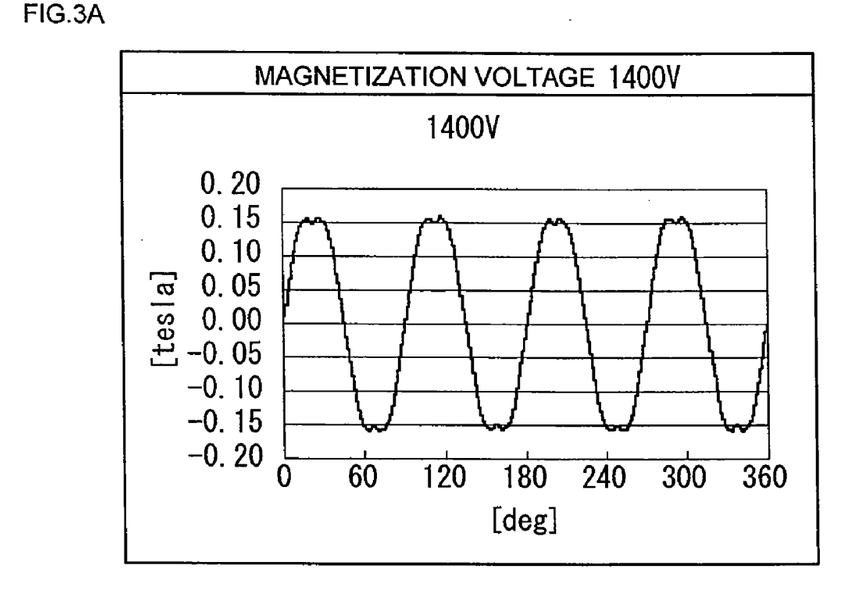
FIG. 3A illustrates a magnetic flux waveform on the inner circumferential surface of a magnet.
Figure 3B:
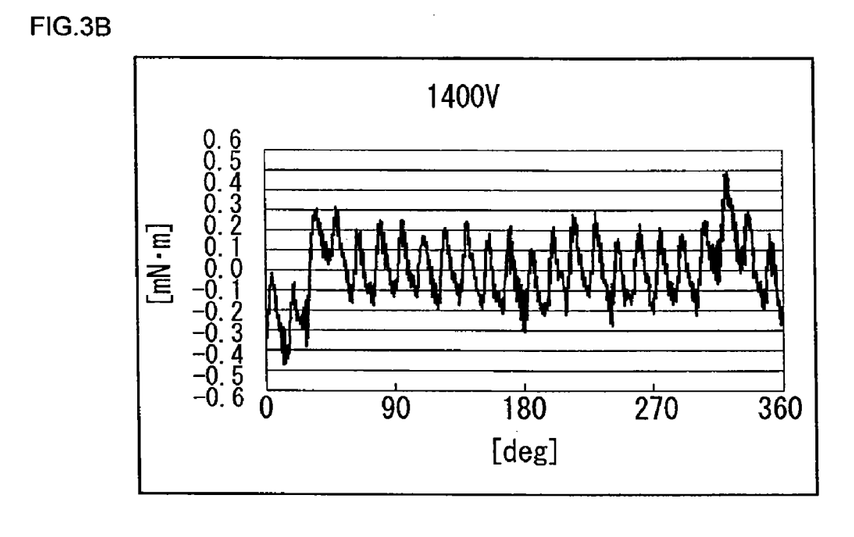
FIG. 3B illustrates a waveform of cogging torque.
Figure 4A:
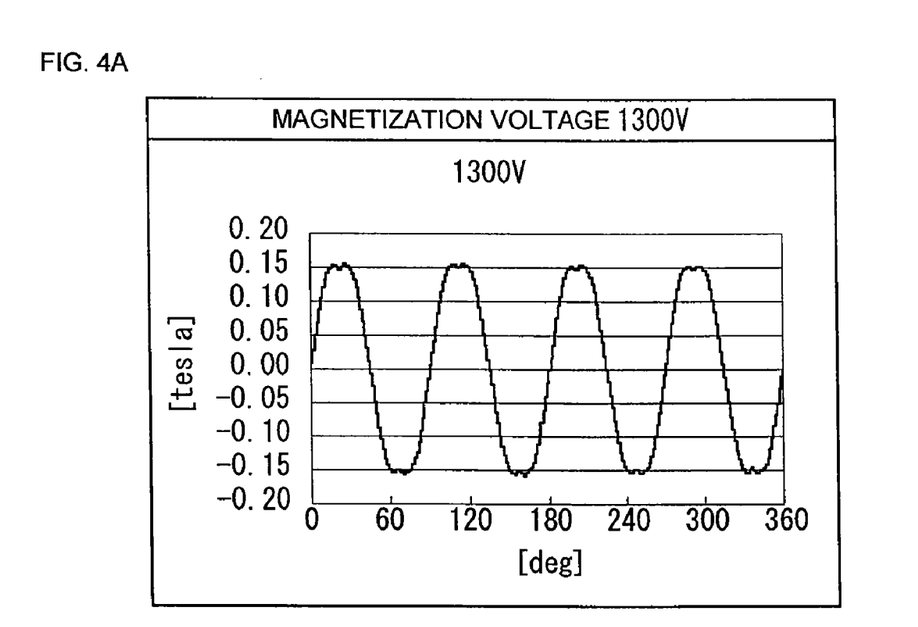
FIG. 4A illustrates a magnetic flux waveform on the inner circumferential surface of the magnet.
Figure 4B:
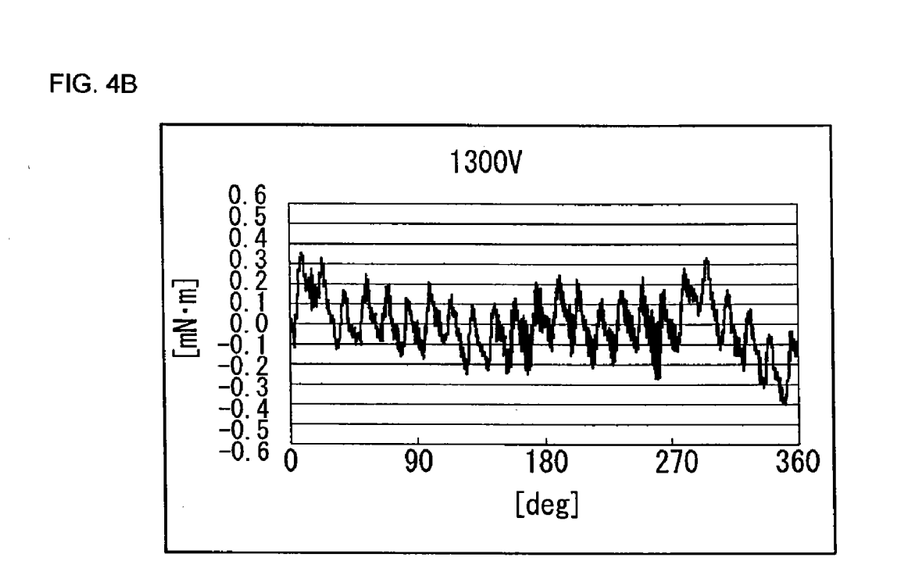
FIG. 4B illustrates a waveform of the cogging torque.
Figure 5A:
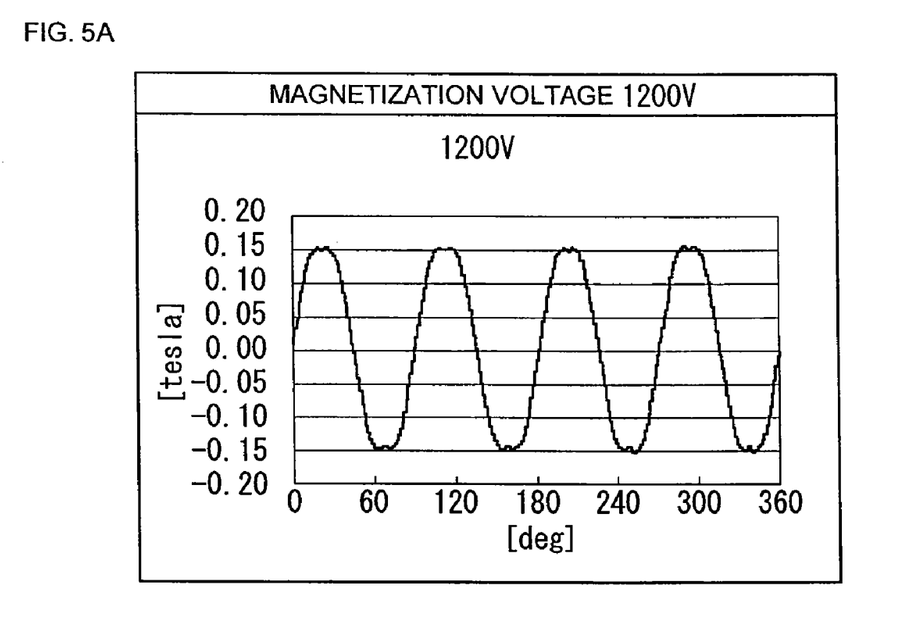
FIG. 5A illustrates a magnetic flux waveform on the inner circumferential surface of the magnet.
Figure 5B:
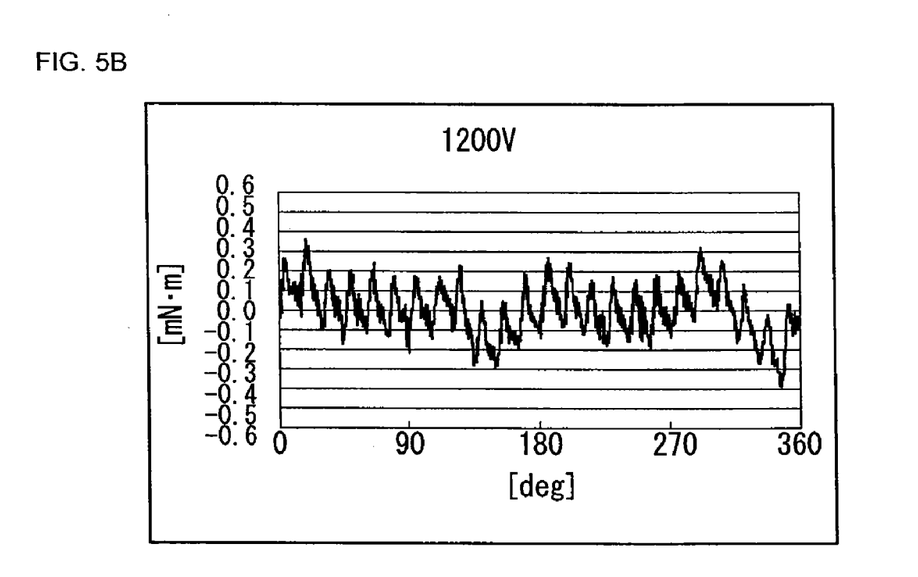
FIG. 5B illustrates a waveform of the cogging torque.
Figure 6A:
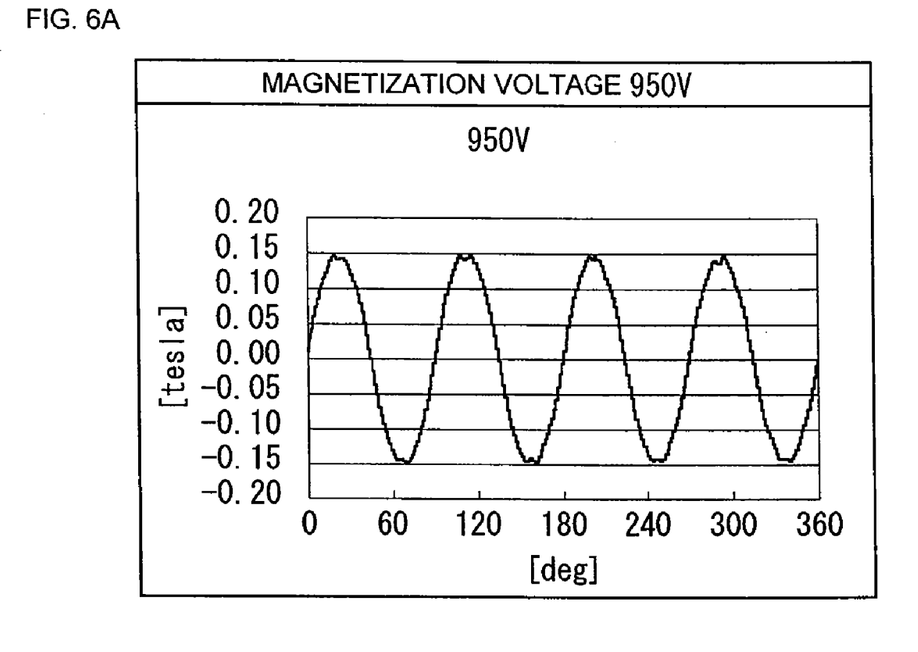
FIG. 6A illustrates a magnetic flux waveform on the inner circumferential surface of the magnet.
Figure 6B:
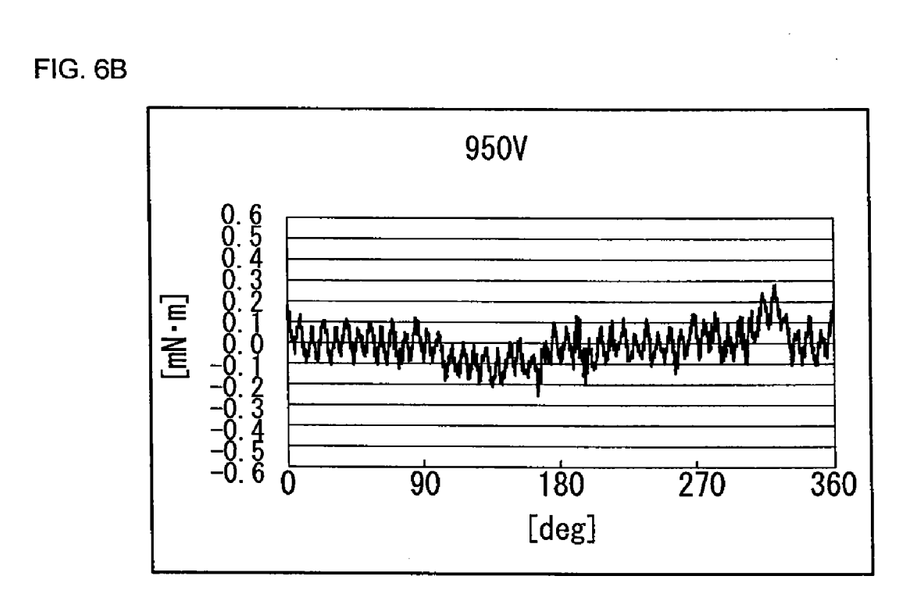
FIG. 6B illustrates a waveform of the cogging torque.
Figure 7A:
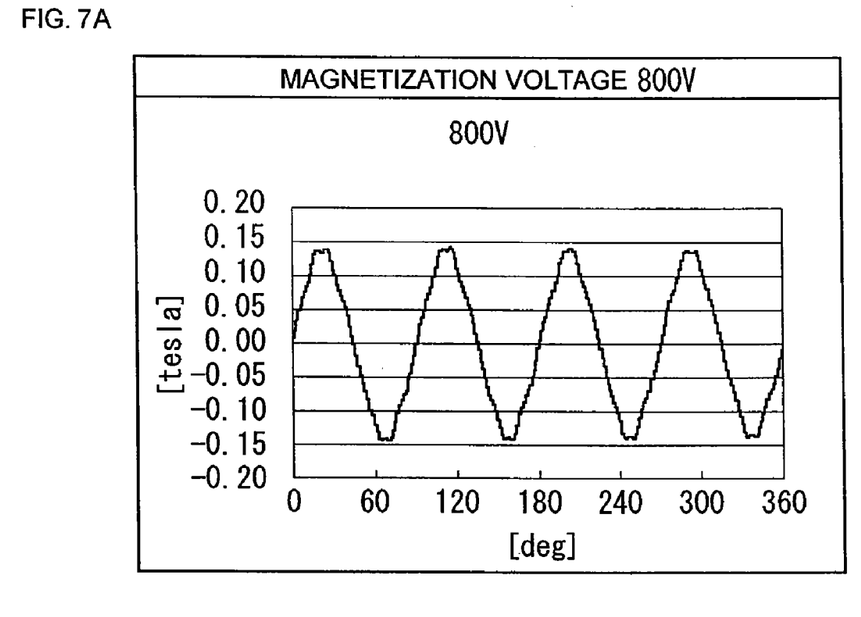
FIG. 7A illustrates a magnetic flux waveform on the inner circumferential surface of the magnet.
Figure 7B:
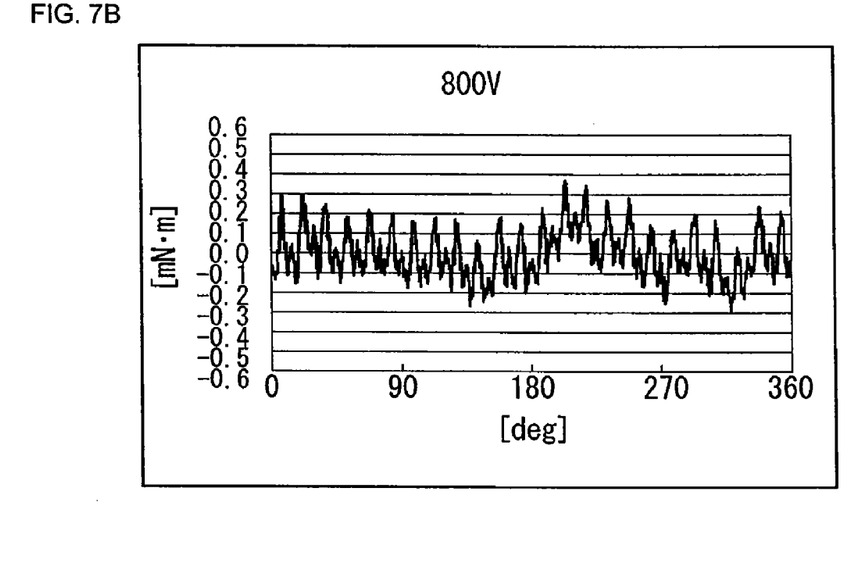
FIG. 7B illustrates a waveform of the cogging torque.

As illustrated in FIGS. 3B, 4B, and 5B, when the magnetization voltages are respectively 1400 V, 1300 V, and 1200 V, the amplitudes of the cogging torque do not vary greatly and the major component of each cogging torque is the fundamental frequency component (the number of pulsations is 24). However, when the magnetization voltage is within the range of 900 V to 1000 V, the major component of the cogging torque is the second frequency component (the number of pulsations is 48) and the amplitude thereof is small. In particular, the amplitude of the cogging torque when the magnetization voltage is 950 V, illustrated in FIG. 6B, is half that of each cogging torque illustrated in FIGS. 3B, 4B and 5B and the major pulse component of the cogging torque is the second frequency component. In addition, as illustrated in FIG. 7B, when the magnetization voltage is decreased to 800 V, the amplitude of the cogging torque is almost the same as that when the magnetization voltage is 1300 V, as illustrated in FIG. 4B, and the major component thereof returns from the second frequency component to the fundamental frequency component.

After the study on the vibrations due to the cogging torque in the disk drive devices respectively provided with magnets 7 magnetized with these magnetization voltages, the present inventor has acquired the following results. There have been almost no differences among the vibrations due to the cogging torque when the magnetization voltages were 1400 V, 1300 V, 1200 V, and 800 V. On the other hand, in the disk drive device 50 provided with the magnet 7 magnetized with the magnetization voltage of 950 V, the vibration due to the cogging torque has been decreased by approximately 70 percent in comparison with that due to other cogging torque. This can be obtained by the following reasons. The amplitude of the pulsations of the cogging torque was reduced to approximately half; and the major pulsation was the second frequency component, the number of pulsations of which was twice. The vibration due to the cogging torque can be reduced to 30 percent by a synergetic effect of the aforementioned phenomena.

When the disk drive device 50 is used while being rotated at 7200/min, the vibration due to the fundamental frequency component of the cogging torque (hereinafter, the vibration due to the fundamental frequency component of the cogging torque is simply referred to as the "fundamental frequency component vibration") is approximately 2880 Hz whereas the vibration due to the second frequency component of the cogging torque (hereinafter, the vibration due to the second frequency component of the cogging torque is simply referred to as the "second frequency component vibration") is approximately 5760 Hz. There is a problem that, because the resonance of the second rocking mode, which will be described later, is generated near 3120 Hz and 3360 Hz in the disk drive device 50, the vibration due to the fundamental frequency component, close to these frequencies, is emphasized.

In the disk drive device 50 according to the embodiment, the fundamental frequency component of the cogging torque can be made smaller than the second frequency component thereof by controlling the magnetization voltage for the magnet 7. As a result, the major frequency component of the cogging torque can be remote from the resonance frequency of the second rocking mode such that the ratio at which the vibration due to the fundamental frequency component is emphasized by the resonance of the second rocking mode is small. Thereby, the vibration due to the cogging torque can be greatly reduced.

The peak-to-peak value (hereinafter, referred to as the "P-P value") of the cogging torque illustrated in FIG. 6 is below 0.3 mN·m (millinewton·meter). If the P-P value of the cogging torque is greater than or equal to 0.3 mN·m, the vibration due to the fundamental frequency component is emphasized by the resonance of the second rocking mode when the rotating body portion 18 is used while being rotated at 7200/min, resulting in an increase in the error rate in reading/writing data. In the comparative technique, there is a problem that the rotational speed has to be suppressed to, for example, 5400/min while being used in order to avoid this phenomenon. On the other hand, in the disk drive device 50 according to the embodiment, the P-P value of the fundamental frequency component of the cogging torque can be less than or equal to 0.2 mN·m by, for example, controlling the magnetization voltage, allowing for the vibration due to the cogging torque to be suppressed. By reducing the P-P value of the fundamental frequency component of the cogging torque to a value less than or equal to 0.2 mN·m, the error rate in reading/writing data can be reduced to a value within the acceptable range even when the disk drive device 50 is used while being rotated at 7200/min.

Subsequently, the torque ripple will be described. The drive unit 20 that rotationally drives the recording disk 5 creates a drive torque by the interaction of the rotating magnetic field created in the coil 6 with the driving magnetic poles of the magnet 7. Torque ripple exists in the drive torque, and the frequency Ft of the fundamental wave of the torque ripple (hereinafter, the frequency of the fundamental wave of the torque ripple is simply referred to as "Ft") is proportional to the rotational number per second N (Hz) of the rotating body portion 18. When the number of driving magnetic poles of the magnet 7 is P in the case of a three-phase drive, Ft is represented by Ft=3×P×N. Specifically, when the disk drive device is used while being rotated at 7200/min, N=120 Hz, P=8, and Ft=2880 Hz hold.

After the study on the relationship between the torque ripple and vibrations, the present inventor has acquired the following knowledge. In the comparative technique, the outer diameter of the magnetization yoke to be interpolated into the magnet 7 is made so as to be smaller than the inner diameter of the magnet 7 by 0.5 to 0.7 mm. When the magnet 7 is magnetized at the location eccentric from the center of the magnetization yoke of the magnet, the driving magnet poles are formed in a 0.5 to 0.7 mm-eccentric state. In the back electromotive force generated in the coil 6 when the disk drive device provided with the magnet 7 is rotated in which the driving magnetic poles of the magnet 7 are eccentrically located, the coefficient of variation in the amplitude (hereinafter, referred to as the "AM (Amplitude Modulation) coefficient of variation") during one rotation is large due to the eccentricity of the driving magnetic poles. The AM coefficient of variation will be described with reference to FIG. 8.

Figure 8:
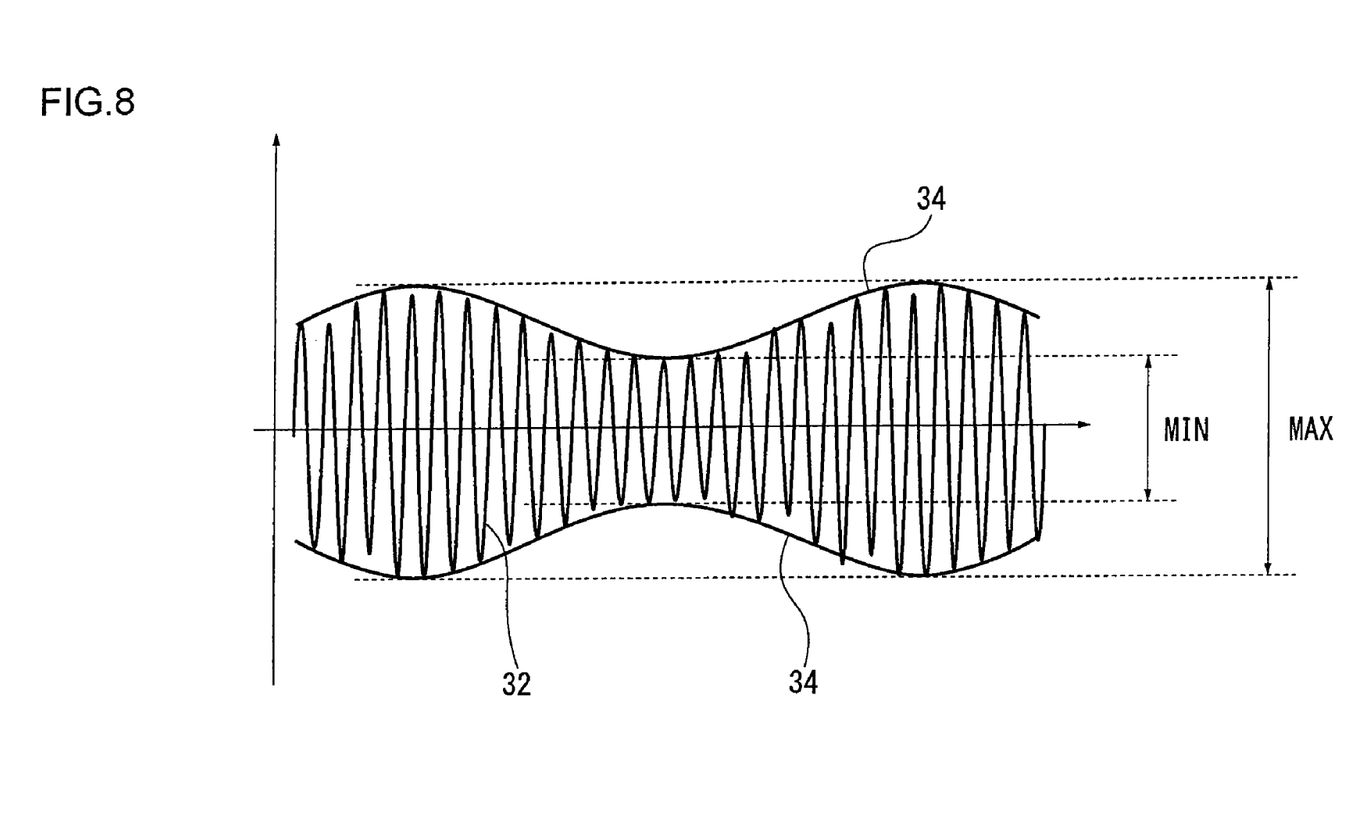
FIG. 8 is a view illustrating the AM (Amplitude Modulation) coefficient of variation of the back electromotive force generated in a coil.

FIG. 8 illustrates the AM coefficient of variation of the back electromotive force generated in the coil 6. The vertical axis of this drawing represents the back electromotive force whereas the horizontal axis thereof represents the rotational angle. Two envelopes 34, in contact with the peaks of the waveform 32 of the back electromotive force, are illustrated in this drawing. Herein, when the maximum of the back electromotive force during one rotation, represented in the difference of the vertical axis of the two envelopes 34, is assumed to be MAX whereas the minimum thereof is assumed to be MIN, the AM coefficient of variation of the back electromotive force is defined as the percentage of (MAX−MIN)/MAX.

As the variation of the back electromotive force from the MAX to the MIN shows, the drive torque varies in accordance with the rotational angle of the hub 4, so that ±N variation is generated in the frequency of the torque ripple, making the frequency of the torque ripple become Ft±N. For example, when the disk drive device is used while being rotated at 7200/min, the maximum frequency of the torque ripple becomes Ft+N=3000 Hz. Herein, FIGS. 9 and 10 respectively illustrate the results of an experiment for confirming the variations in the vibrations due to the torque ripple when the AM coefficients of variation have respectively varied.

Figure 9:
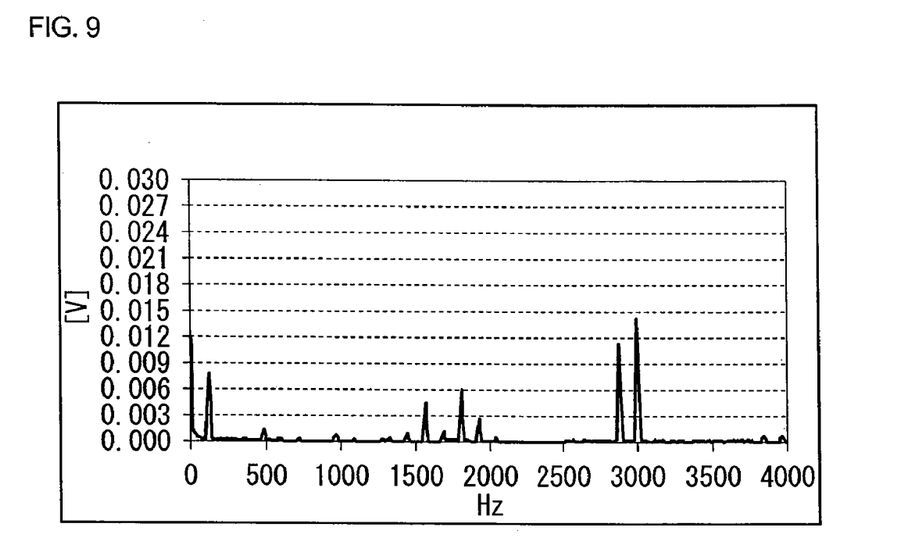
FIG. 9 is a graph indicating the result of performing frequency analysis on the vibration due to the torque ripple in the disk drive device when the AM coefficient of variation of the back electromotive force, generated in a coil according to a comparative technique, is 5 percent.

FIG. 9 is a graph indicating the result of performing a frequency analysis on the vibration due to the torque ripple in the disk drive device when the AM coefficient of variation of the back electromotive force, generated in the coil 6 according to the comparative technique, is 5 percent. The vertical axis of the drawing represents the back electromotive force whereas the horizontal axis represents the frequency.

In this drawing, high peaks can be seen at 2880 Hz and 3000 Hz. In the disk drive device 50, the resonance of the second rocking mode, which will be described later, occurs near 3120 Hz and 3360 Hz. The vibration due to the component at 3000 Hz, which is close to the above frequencies, is emphasized, resulting in an increase in the error rate in reading/writing data in the disk drive device 50 according to the comparative technique. There is a problem that the disk drive device is used while the rotational speed thereof is being reduced to, for example, 5400/min in order to avoid the aforementioned phenomenon. To deal with the problem, in disk drive device 50 according to the embodiment, the outer diameter of the magnetization yoke is enlarged to magnetize magnet 7. For example, the difference between the outer diameter of the magnetization yoke and the inner diameter of the magnet 7 is set to less than or equal to 0.2 mm to magnetize the magnet 7. Thereby, the magnet 7 can be magnetized in a state where the eccentricity of the driving magnet poles is suppressed to less than or equal to 0.2 mm, allowing for the AM coefficient of variation of the back electromotive force, generated in the coil 6, to be less than or equal to 2 percent.

Figure 10:
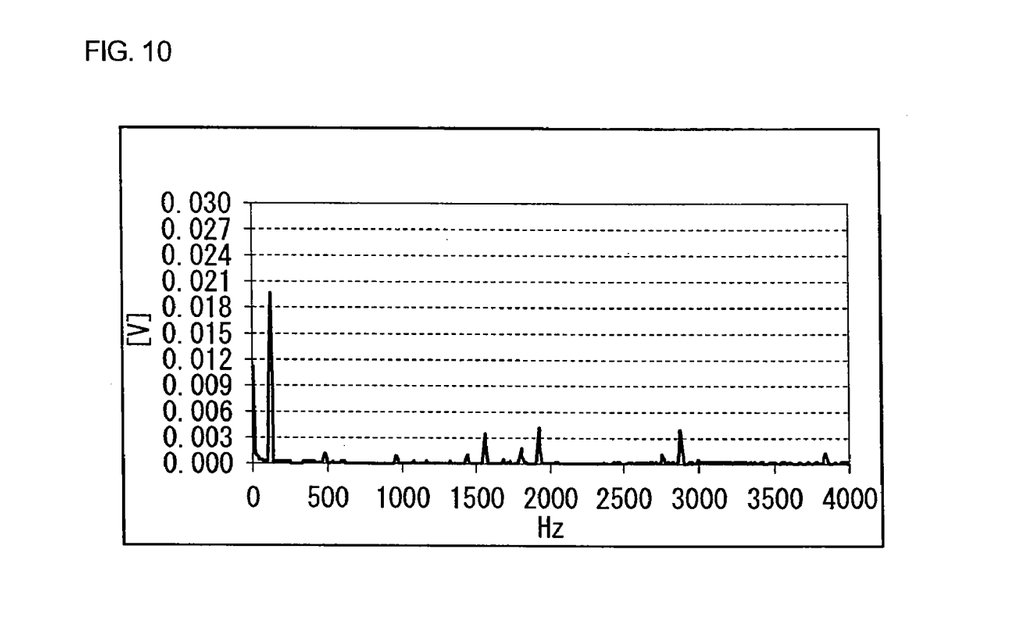
FIG. 10 is a graph indicating the result of performing frequency analysis on the vibration due to the torque ripple in the disk drive device when the AM coefficient of variation of the back electromotive force, generated in the coil according to the embodiment, is 2 percent.

The analysis result is shown in FIG. 10.

FIG. 10 is a graph indicating the result of performing a frequency analysis on the vibration due to the torque ripple in the disk drive device when the AM coefficient of variation of the back electromotive force, generated in the coil 6 according to the embodiment, is 2 percent. The vertical axis of the drawing represents the back electromotive force whereas the horizontal axis represents the frequency.

In this drawing, the peaks at 2880 Hz and 3000 Hz are very low in comparison with FIG. 9. As a result, the disk drive device 50 can be used while being rotated at 7200/min. That is, the vibration due to the torque ripple can be suppressed by enlarging the outer diameter of the magnetization yoke to magnetize the magnet 7 such that the AM coefficient of variation of the back electromotive force, generated when the coil 6 is rotated, is reduced to less than or equal to 2 percent, allowing for the error rate in reading/writing data to be within the acceptable range even when the disk drive device 50 is used while being rotated at 7200/min.

Alternatively, in the disk drive device 50 according to the embodiment, the P-P value of the fundamental frequency component of the cogging torque may be less than or equal to 0.2 mN·m by, for example, controlling the magnetization voltage, while the AM coefficient of variation of the back electromotive force, generated in the coil 6, has been reduced to less than or equal to 2 percent by enlarging the outer diameter of the magnetization yoke. Thereby, the disk drive device 50 can be used while being rotated at a higher speed.

Figure 11:
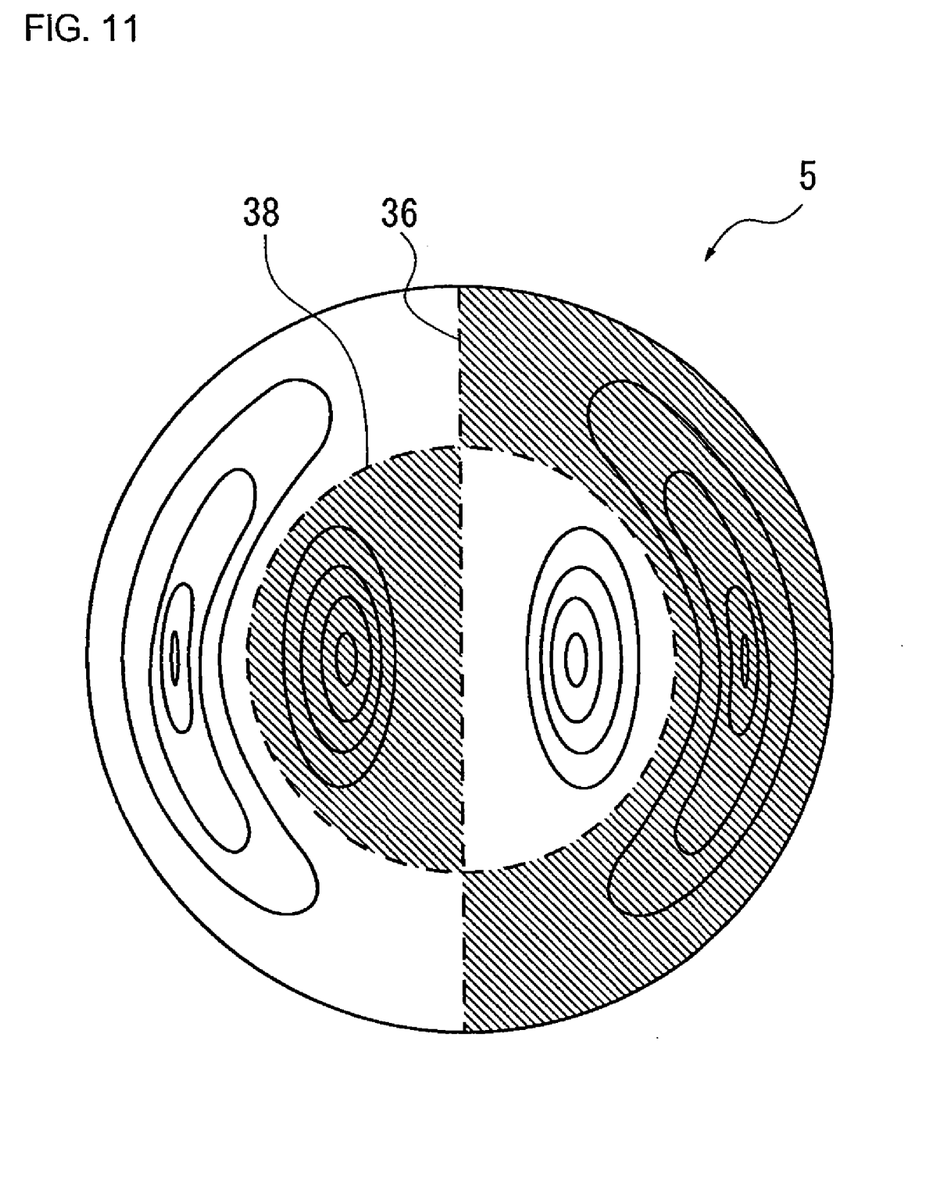
FIG. 11 is a schematic view schematically illustrating a state of vibration momentarily generated on a recording disk.

Subsequently, the resonance of the second rocking mode will be described. FIG. 11 is a schematic view schematically illustrating a state of the vibration momentarily generated on the surface of the recording disk 5. In FIG. 11, the dashed lines represent a nodal diameter 36 and a nodal circle 38 near the torque ripple frequency in which the areas with hatching show that the phase of the vibration near the torque ripple frequency in the regions is opposite to that in the areas without hatching, whereas the solid lines represent contour lines of the displacement of the vibration near the torque ripple frequency.

On the other hand, the resonance in the disk drive device 50 when the recording disk 5 whose diameter is 3.5 inches, i.e., 95 mm, is not rotated in a state of being mounted on the disk drive device 50, has been studied. As a result, the resonance of the second rocking mode, consisting of the nodal diameter 36 and the nodal circle 38 located in the intermediate portion of the recording disk 5, as illustrated in FIG. 11, has been observed near the torque ripple frequency. The natural resonance frequency of the second rocking mode when the recording disk 5 is not rotated in a state of being mounted on the hub 4, is assumed to be Fr.

The phenomenon has been confirmed by the present inventor in which, when the recording disk 5 is rotated in the disk drive device 50, the resonance frequency Fr of the second rocking mode is split in the rotational direction and in the counter—rotational direction by the gyroscopic precession, with increases in the rotation of the recording disk 5. Specifically, when the recording disk 5 is rotated at the rotational speed per second N (Hz), the amount of the split is ±N (Hz), and the two split resonance frequencies of the second rocking mode Fs (hereinafter, simply referred to as "split frequency") are represented by the following Equation 1:

$$Fs = Fr \pm N \text{ (Hz)} \quad (1).$$

The present inventor has taken into consideration two split frequencies (Fs) when using the resonance of the second mode rocking.

Figure 12:
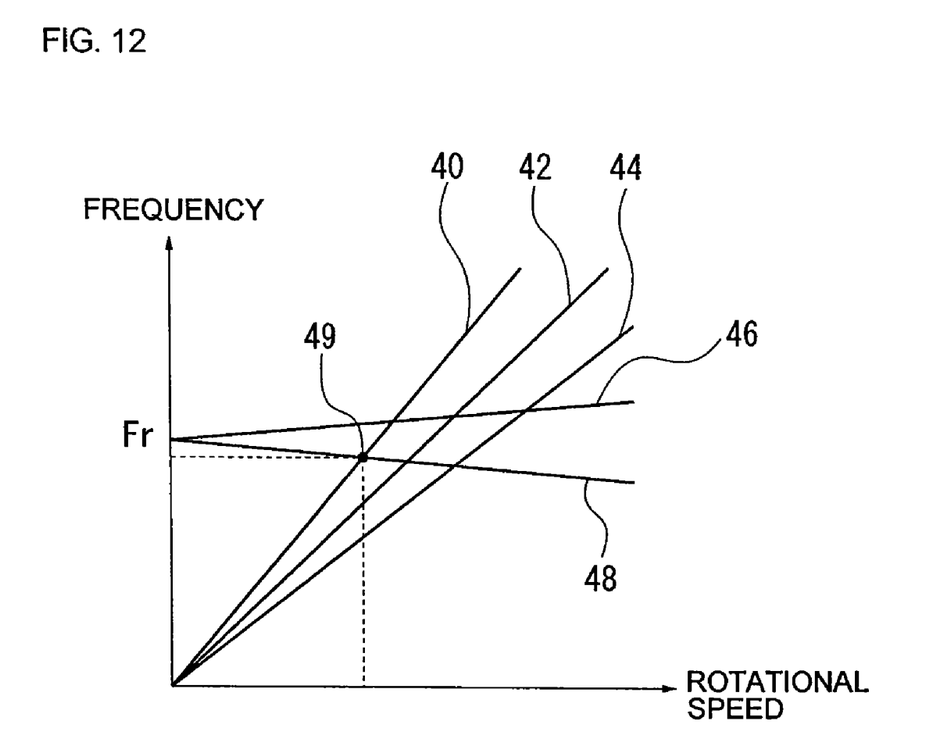
FIG. 12 is a graph illustrating the relationship between the rotational speed and the frequency of the torque ripple or the resonance frequency of the second rocking mode in the disk drive device according to the embodiment.

FIG. 12 illustrates the relationship between the rotational speed and the frequency of the torque ripple or the resonance frequency of the second rocking mode in the disk drive device 50 according to the embodiment. The vertical axis of the drawing represents the frequency whereas the horizontal axis thereof represents the rotational speed, i.e., the rotational number per second N (Hz). A straight line 42 represents the frequency Ft of the torque ripple, a straight line 40 represents the maximum frequency Ft+N of the varied torque ripple, and a straight line 44 represents the minimum frequency Ft−N of the varied torque ripple. A straight line 46 represents the maximum split frequency Fs=Fr+N, and a straight line 48 represents the minimum split frequency Fs=Fr−N.

Herein, from the study by the present inventor, the following knowledge has been acquired in which the major factors by which the resonance frequency Fr of the second rocking mode are determined are the rigidity of the bearing, the rigidity of the joint portion between the hub 4 and the shaft 3, the rigidity of the joint portion between the recording disk 5 and the hub 4, the rigidity of the recording disk 5 itself, the horizontal moment of inertia of the recording disk 5, and the horizontal moment of inertia of the hub 4. The Fr can be changed by varying these factors.

In the intersections formed by each straight line illustrated in the drawing, a phenomenon is generated in which the vibration due to the torque ripple is greatly emphasized by the influence of the resonance of the second rocking mode (hereinafter, the phenomenon is referred to as the "interference of vibration and resonance"). The interference of vibration and resonance occurs in the region where the frequency and rotational speed are higher than that at the intersection 49 between the straight line 48, representing Fr−N, and the straight line 40, representing Ft+N. In the region surrounded by the dashed lines where a frequency and a rotational speed are lower than that at the intersection 49, the interference between vibration and resonance does not occur. Accordingly, the interference between vibration and resonance can be prevented by making the minimum resonance frequency Fr−N of the second rocking mode higher than the maximum frequency Ft+N of the torque ripple. That is, the region surrounded by the dashed lines in the drawing where the interference does not occur can be enlarged by making the resonance frequency Fr of the second rocking mode higher, allowing the rotation speed to be increased. From the aforementioned knowledge, the resonance frequency of the second rocking mode will be determined in accordance with the following Equation 2. By making the natural frequency Fr satisfy Fr>N×(3×P+2), the interference between vibration and resonance can be suppressed. Equation 2-2 is obtained by substituting the aforementioned Ft=3×P+2 into Equation 2-1:

$$Fr-N > Ft+N \quad (2\text{-}1)$$

$$Fr > N \times (3 \times P+2) \quad (2\text{-}2).$$

Because Equation 2-2 represents the critical value, it is preferable that, in order to more surely prevent the aforementioned problem regarding the resonance of the second rocking mode, further taking into consideration change in temperature, deterioration with age, part accuracy, and variation in manufacturing, the minimum frequency of Fr is to be further made higher by a factor greater than or equal to N as the margin corresponding to the above influencing factors, as represented by Equation 3:

$$Fr > N \times (3 \times P+2) + N \quad (3)$$

In the disk drive device 50 according to the embodiment, the following measures may be combined with each other: Fr is designed to be greater than N×(3×P+2); the AM coefficient of variation of the back electromotive force, generated in the coil, is designed to be less than or equal to 2 percent; and the P-P value of the LCM component of the cogging torque is designed to be less than or equal to 0.2 mN·m. As a result, the disk drive device 50 can be used while being rotated at a higher speed.

The present invention should not be limited to the aforementioned embodiments, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A disk drive device comprising:
a hub on which a recording disk is to be mounted;
a base configured to rotatably support the hub via a bearing;
a core that is fixed to the base and includes a circular portion and S salient poles extending from the circular portion in the diameter direction, where S is a natural number greater than or equal to 3;
a three-phase coil formed by each of the S salient poles being wound; and
a magnet that is fixed to the hub and faces the S salient poles in the diameter direction, and that is provided with P driving magnetic poles in the circumferential direction, where P is a natural number greater than or equal to 2, wherein the peak-to-peak value of a fundamental frequency component of cogging torque based on the LCM of S and P, where S is the number of the salient poles of the core and P is the number of the driving magnetic poles of the magnet, is less than or equal to 0.2 (mN·m).

2. The disk drive device according to claim 1, wherein the coefficient of variation in the amplitude of a back electromotive force generated when the coil is rotated is less than or equal to 2 percent during one rotation of the coil.

3. The disk drive device according to claim 1, wherein the difference between the outer diameter of a magnetization yoke, which provides the magnet with driving magnetic poles, and the inner diameter of the magnet is designed to be less than or equal to a predetermined value.

4. The disk drive device according to claim 1, wherein a magnetization voltage when the magnet is provided with driving magnetic poles is controlled so as to be within a predetermined range.

5. The disk drive device according to claim 1, wherein, when the rotational number of the hub is N (Hz) and the natural frequency of a second rocking mode when the recording disk is not rotated in a state where the recording disk is mounted on the hub is Fr (Hz), the natural frequency Fr satisfies Fr>N×(3×P+2).

6. A disk drive device comprising:
a hub on which a recording disk is to be mounted;
a base configured to rotatably support the hub via a bearing;
a core that is fixed to the base and includes a circular portion and S salient poles extending from the circular portion in the diameter direction, where S is a natural number greater than or equal to 3;
a three-phase coil that is formed by being wound around each of the S salient poles; and
a magnet that is fixed to the hub and faces the S salient poles in the diameter direction, and that is provided with P driving magnetic poles in the circumferential direction, where P is a natural number greater than or equal to 2, wherein the coefficient of variation in the amplitude of the back electromotive force generated when the coil is rotated, is less than or equal to 2 percent during one rotation of the coil.

7. The disk drive device according to claim 6, wherein, when the rotational number of the hub is N (Hz) and the natural frequency of a second rocking mode when the recording disk is not rotated in a state where the recording disk is mounted on the hub is Fr (Hz), the natural frequency Fr satisfies Fr>N×(3×P+2).

8. The disk drive device according to claim 6, wherein the difference between the outer diameter of a magnetization yoke, which provides the magnet with driving magnetic poles, and the inner diameter of the magnet is designed to be less than or equal to a predetermined value.

9. The disk drive device according to claim 1, wherein the fundamental frequency component of cogging torque is smaller than a second frequency component of the cogging torque, the frequency of which is twice the fundamental frequency.

10. The disk drive device according to claim 1, wherein a magnetization voltage when the magnet is provided with driving magnetic poles is controlled so as to be within a range lower than a maximum magnetization voltage.

11. The disk drive device according to claim 1, wherein a three-phase current having an approximate sine wave shape is applied to the coil by a predetermined drive circuit.

12. The disk drive device according to claim 1, wherein the hub is formed into a predetermined shape by machining a steel material having a soft magnetism.

13. The disk drive device according to claim 6, wherein a fundamental frequency component of cogging torque based on the LCM (Least Common Multiple) of S and P, where S is the number of the salient poles of the core and P is the number of the driving magnetic poles of the magnet, is smaller than a second frequency component of the cogging torque, the frequency of which is twice the fundamental frequency.

14. The disk drive device according to claim 6, wherein a magnetization voltage when the magnet is provided with driving magnetic poles is controlled so as to be within a predetermined range.

15. The disk drive device according to claim 6, wherein a magnetization voltage when the magnet is provided with driving magnetic poles is controlled so as to be within a range lower than a maximum magnetization voltage.

16. The disk drive device according to claim 6, wherein a three-phase current having an approximate sine wave shape is applied to the coil by a predetermined drive circuit.

17. The disk drive device according to claim 6, wherein the hub is formed into a predetermined shape by machining a steel material having a soft magnetism.

* * * * *